(12) United States Patent
Duan (10) Patent No.: US 9,179,004 B2
(45) Date of Patent: Nov. 3, 2015

(54) METHOD AND APPARATUS FOR CHARGING

(71) Applicant: HUAWEI TECHNOLOGIES CO., LTD., Shenzhen (CN)

(72) Inventor: Haifeng Duan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 81 days.

(21) Appl. No.: 14/144,033

(22) Filed: Dec. 30, 2013

(65) Prior Publication Data

US 2014/0113585 A1    Apr. 24, 2014

Related U.S. Application Data

(63) Continuation of application No. PCT/CN2012/078506, filed on Jul. 11, 2012.

(30) Foreign Application Priority Data

Jul. 11, 2011   (CN) .......................... 2011 1 0193231

(51) Int. Cl.
*H04M 11/00* (2006.01)
*H04M 15/00* (2006.01)
*H04W 4/24* (2009.01)
*H04L 12/14* (2006.01)
*H04W 12/06* (2009.01)
*H04M 15/06* (2006.01)
*H04L 29/06* (2006.01)
*H04L 29/12* (2006.01)

(52) U.S. Cl.
CPC ............ *H04M 15/42* (2013.01); *H04L 12/1485* (2013.01); *H04W 4/24* (2013.01); *H04W 12/06* (2013.01); *H04L 61/6018* (2013.01); *H04L 63/0876* (2013.01); *H04M 15/06* (2013.01)

(58) Field of Classification Search
CPC ......... H04W 4/24; H04W 4/26; H04M 15/66; H04M 15/62; H04M 15/85; H04M 15/715; H04M 2215/208; H04M 15/63; H04M 15/82; H04M 15/8257; H04L 12/14; H04L 12/1403; H04L 12/1407
USPC ................................................. 455/405–408
See application file for complete search history.

(56) References Cited

U.S. PATENT DOCUMENTS

| | | | |
|---|---|---|---|
| 7,526,075 B2 * | 4/2009 | Guo et al. | ................ 379/114.03 |
| 8,813,168 B2 * | 8/2014 | Riley et al. | ........................ 726/1 |
| 2004/0005875 A1 | 1/2004 | Ko et al. | |
| 2010/0217698 A1 | 8/2010 | Kang et al. | |

(Continued)

FOREIGN PATENT DOCUMENTS

| | | |
|---|---|---|
| CN | 1476265 A | 2/2004 |
| CN | 1917544 A | 2/2007 |

(Continued)

*Primary Examiner* — Magdi Elhag
(74) *Attorney, Agent, or Firm* — Brinks Gilson & Lione (57) ABSTRACT

A method and an apparatus for charging, related to the technical field of communications, are invented in an attempt to enhance charging accuracy of a charging system. A method for charging comprises: acquiring an IMEI number of a target charging terminal; determining a type of the target charging terminal by utilizing the IMEI number of the target charging terminal, according to a corresponding relationship between relevant information of a terminal identifier and a terminal type; and charging the target charging terminal according to the type of the target charging terminal.

16 Claims, 5 Drawing Sheets

(56) References Cited

U.S. PATENT DOCUMENTS

| | | | |
|---|---|---|---|
| 2011/0086610 A1* | 4/2011 | Baldwin et al. | 455/405 |
| 2011/0159843 A1* | 6/2011 | Heath et al. | 455/411 |
| 2011/0225309 A1* | 9/2011 | Riley et al. | 709/228 |
| 2011/0249618 A1* | 10/2011 | Shaw et al. | 370/328 |
| 2012/0240184 A1* | 9/2012 | Thirasuttakorn et al. | 726/1 |
| 2012/0327813 A1* | 12/2012 | Mohammed et al. | 370/259 |

FOREIGN PATENT DOCUMENTS

| | | |
|---|---|---|
| CN | 101018413 A | 8/2007 |
| CN | 101076200 A | 11/2007 |
| CN | 101431419 A | 5/2009 |
| CN | 102223616 A | 10/2011 |
| WO | WO 2006/067265 A1 | 6/2006 |

\* cited by examiner

METHOD AND APPARATUS FOR CHARGING

CROSS-REFERENCE TO RELATED APPLICATIONS

This application is a continuation of International Application No. PCT/CN2012/078506, filed on Jul. 11, 2012, which claims priority to Chinese Patent Application No. 201110193231.5 filed on Jul. 11, 2011, both of which are hereby incorporated by reference in their entireties.

TECHNICAL FIELD

The present invention relates to the technical field of communications, and in particular, to a method and an apparatus for charging.

BACKGROUND

Along with the development of wireless network technology and data service, more and more high-end intelligent terminals have emerged in market. In contrast to conventional terminals, a processor, a memory, and storage capacity of the high-end intelligent terminals have been enhanced to great extent. In order to provide differentiated services, how to identify the high-end intelligent terminals is the primary issue needed to be addressed by an operator for increasing income.

For example, in order to realize differentiated charging different types of terminals, the following two modes are adopted in the prior art:

The first mode: to set an independent APN (Access Point Name, access point name) for each high-end intelligent terminal, for the sake of distinguishing the high-end intelligent terminals from ordinary terminals, so as to realize the differentiated charging the terminals.

The second mode: to employ a UserAgent field at the head of the application layer protocol to distinguish the high-end intelligent terminals from the ordinary terminals, so as to realize the differentiated charging of the terminals.

Nevertheless, during the implementation process of the present invention, the inventor has found that, regardless of the aforementioned first mode or second mode, in the prior art, any setting for distinguishing the different types of terminals may be modified so that a charging system cannot accurately distinguish the terminal types, resulting in inaccurate charging of the charging system.

SUMMARY

Embodiments of the present invention provide a method and an apparatus for charging to enhance charging accuracy of a charging system.

A method for charging a terminal with an international mobile equipment identity (IMEI), wherein the method is implemented in a communication network system, includes:
 acquiring, by a network access server (NAS) or a gateway, an IMEI number of a target charging terminal;
 determining, by the network access server (NAS) or the gateway, a type of the target charging terminal by utilizing the IMEI number of the target charging terminal, according to a corresponding relationship between relevant information of a terminal identifier and a terminal type; wherein the relevant information of the terminal identifier is related to the IMEI number, and
 charging, by a charging system, the target charging terminal according to the type of the target charging terminal.

An apparatus for charging a terminal with an international mobile equipment identity (IMEI) includes:
 a first information acquisition unit, configured to acquire an IMEI number of a target charging terminal;
 a second information acquisition unit, configured to determine a type of the target charging terminal by utilizing the IMEI number of the target charging terminal, according to a corresponding relationship between relevant information of a terminal identifier and a terminal type; and
 an information providing unit, configured to provide a charging system with the type of the target charging terminal so that the charging system charges the target charging terminal according to the type of the target charging terminal.

An apparatus charging a terminal with an international mobile equipment identity (IMEI) includes:
 a first information acquisition unit, configured to acquire an IMEI number of a target charging terminal;
 a second information acquisition unit, configured to determine a type of the target charging terminal by using the IMEI number of the target charging terminal, according to a corresponding relationship between relevant information of a terminal identifier and a terminal type; and
 an information transmission unit, configured to charge the target charging terminal according to the type of the target charging terminal.

The method and apparatus for charging according to embodiments of the present invention acquire an IMEI number of a target charging terminal, and, according to a corresponding relationship between relevant information of a terminal identifier and a terminal type, determine a type of the target charging terminal by utilizing the IMEI number of the target charging terminal, so that a charging system charges the target charging terminal according to the type of the target charging terminal. In view of the above, in embodiments of the present invention, the charging system can accurately acquire the type of a target charging terminal, so as to charge correspondingly the target charging terminal according to the type of the target charging terminal. Therefore, utilizing the method and apparatus for charging according to embodiments of the present invention, charging accuracy of the charging system is improved.

BRIEF DESCRIPTION OF DRAWINGS

In order to further explicitly describe the technical solutions according to embodiments of the present invention, a brief introduction to the drawings required for describing embodiments is presented hereinafter, obviously, the drawings described hereinafter are merely some embodiments of the present invention, and persons skilled in the art can derive other drawings from them without creative efforts.

DESCRIPTION OF EMBODIMENTS

With reference to the accompanying drawings in the embodiments of the present invention, a clear and complete description of the technical solutions in embodiments of the present invention is presented hereinafter. Obviously, the embodiments described here are merely part of the embodiments of the present invention, rather than all of the embodiments. All other embodiments, which can be derived by persons skilled in the art based on embodiments of the present invention without creative efforts, shall fall within the protection scope by the present invention.

Figure 1:
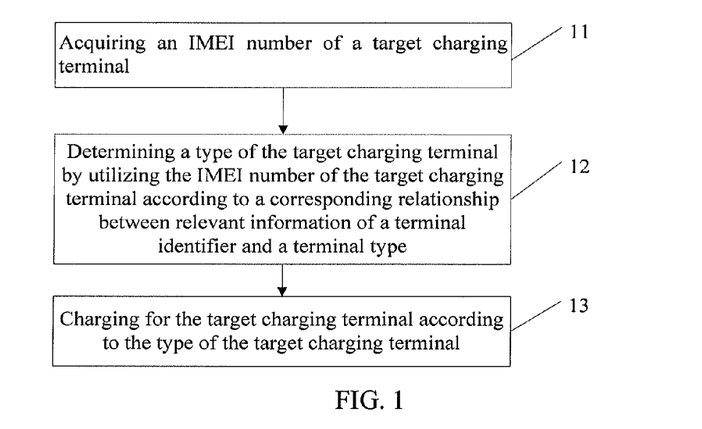
FIG. 1 is a flowchart illustrating a method for charging according to a first embodiment of the present invention.

As shown in FIG. 1, a method for charging according to a first embodiment of the present invention comprises:

Step 11, acquiring an IMEI (International mobile Equipment Identity, international mobile equipment identity) number of a target charging terminal.

In the embodiment herein, the target charging terminal refers to a terminal required to be charged by a charging system, for example, a cell phone, etc.

When activating a data service request, the target charging terminal sends to an access network device its IMEI number via the activated request. After acquiring the IMEI number of the target charging terminal, the access network device sends the IMEI number of the target charging terminal to a NAS (Network Access Server, network access server) via a Radius (Remote Authentication Dial In User Service, remote authentication dial in user service) activation message, and the NAS device includes, but is not limited to, a GGSN (Gateway GPRS Support Node, gateway GPRS support node), a PDSN (Packet Data Serving Node, packet data serving node), and an AGW (Access gateway, access gateway). The network access server resolves the RADIUS activation message to acquire the IMEI number of the target charging terminal. Then, the NAS may as well send to a GW (Gateway, gateway) the IMEI number of the target charging terminal. The NAS or the gateway may, in addition, send to a charging system the IMEI number of the target charging terminal via a trigger charging message, so that the charging system acquires the IMEI number of the target charging terminal.

Step 12, determining a type of the target charging terminal by utilizing the IMEI number of the target charging terminal, according to a corresponding relationship between relevant information of a terminal identifier and a terminal type.

In the embodiment, the relevant information of the terminal identifier is either an IMEI number segment or an IMEI number. Accordingly, the corresponding relationship between the relevant information of the terminal identifier and the terminal type may include a corresponding relationship between the IMEI number segment and the terminal type, and a corresponding relationship between the IMEI number and the terminal type. The IMEI number segment therein refers to an IMEI number interval, such as, 359084010545300—359084010545400; the IMEI number refers to one IMEI number, such as, 359084010545300. The terminal type refers to a type of each of various terminals in practical applications, such as, Nokia N97, Apple iPad, etc.

In the embodiment, the NAS, the GW, the charging system, or an operation and maintenance device of an operator (for example, a customer service center/business office, an operation support system, etc, of the operator) may all acquire the type of the target charging terminal.

When the NAS, or the GW, or the charging system has stored the corresponding relationship between the relevant information of the terminal identifier and the terminal type, the NAS, or the GW, or the charging system may search the corresponding relationship between the relevant information of the terminal identifier and the terminal type stored therein, and determine the type of the target charging terminal according to the IMEI number of the target charging terminal.

To be specific, when the corresponding relationship between the IMEI number segment and the terminal type is stored in the NAS, or the GW, or the charging system, the NAS, or the GW, or the charging system searches the corresponding relationship between the IMEI number segment and the terminal type stored therein, determines the IMEI number segment which the IMEI number of the target charging terminal belongs to according to the IMEI number of the target charging terminal, and employs a terminal type corresponding to the IMEI number segment which the IMEI number of the target charging terminal belongs to as the type of the target charging terminal.

When the corresponding relationship between the IMEI number and the terminal type is stored in the NAS, or the GW, or the charging system, the NAS, or the GW, or the charging system searches the corresponding relationship between the IMEI number and the terminal type stored therein, and determines the type of the target charging terminal according to the IMEI number of the target charging terminal.

When the corresponding relationship between the relevant information of the terminal identifier and the terminal type is stored in the operation and maintenance device, the NAS, the GW, or the charging system may utilize the IMEI number of the target charging terminal to search the type of the target charging terminal from the operation and maintenance device.

Specifically, the NAS, or the GW, or the charging system sends to the operation and maintenance device an inquiring message, and when the corresponding relationship between the IMEI number segment and the terminal type is stored in the operation and maintenance device, the operation and maintenance device searches the corresponding relationship between the IMEI number segment and the terminal type stored therein, determines the IMEI number segment to which the IMEI number of the target charging terminal belongs according to the IMEI number of the target charging terminal, and employs a terminal type corresponding to the IMEI number segment which the IMEI number of the target charging terminal belongs to as the type of the target charging terminal; when the corresponding relationship between the IMEI number and the terminal type is stored in the operation and maintenance device, the operation and maintenance device searches the corresponding relationship between the IMEI number and the terminal type stored therein, and determines a terminal type of the target charging terminal according to the IMEI number of the target charging terminal. Subsequently, the operation and maintenance device sends the type of the target charging terminal to the NAS, or the GW, or the charging system via a response message.

Step 13, charging the target charging terminal according to the type of the target charging terminal.

In the step, charging is carried out by the charging system. If it is the NAS or the gateway that acquires the type of the target charging terminal, the NAS or the GW may send to the charging system a trigger charging message, and the trigger charging message carries the type of the target charging terminal so that the charging system charges the target charging terminal according to the type of the target charging terminal. Otherwise, if it is the charging system that acquires the type of the target charging terminal via the charging system itself, the charging system may directly charge the target charging terminal according to the type of the target charging terminal.

In view of the above, in the embodiment of the present invention, the charging system may accurately acquire the type of the target charging terminal, so as to correspondingly charge the target charging terminal according to the type of the target charging terminal, therefore, using the method for charging according to the embodiment of the present invention, the charging accuracy of the charging system is improved.

In combination with a second embodiment to the fifth embodiment, a method for charging according to embodiments of the present invention is detailed hereinafter.

Figure 2:
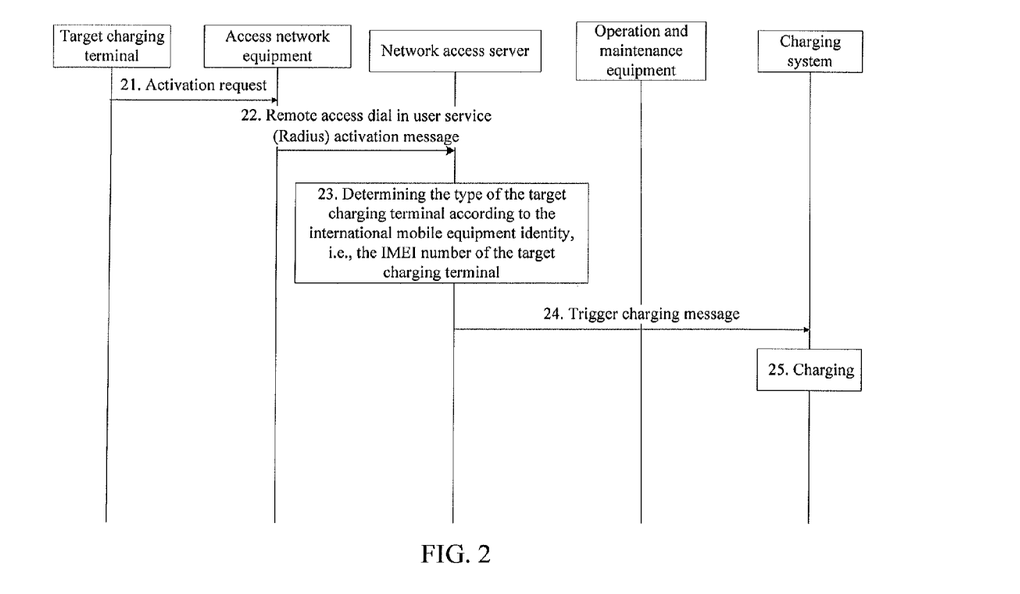
FIG. 2 is a flowchart illustrating a method for charging according to a second embodiment of the present invention.

In the second embodiment, a corresponding relationship between relevant information of a terminal identifier and a terminal type is stored in a NAS or a GW, and a customer service center/business office or an operation support system of an operator synchronizes the corresponding relationship to the NAS or the GW.

As shown in FIG. 2, taking the corresponding relationship between the relevant information of a terminal identifier and a terminal type stored in a NAS as an example, a method for charging according to the second embodiment of the present invention includes:

step 21, when activating a data service request, a target charging terminal reports its IMEI number to an access network device via the activated request.

Step 22, the access network device sends to a NAS device the IMEI number of the target charging terminal via a Radius activation message.

Step 23, the NAS searches the corresponding relationship between the relevant information of the terminal identifier and the terminal type stored therein, and determines the type of the target charging terminal according to the IMEI number of the target charging terminal. Meanwhile, the NAS stores the type of the target charging terminal in an activation conversation of user data service.

For example, in the embodiment, the NAS stores the corresponding relationship between the relevant information of the terminal identifier and the terminal type as shown in Table 1.

TABLE 1

| IMEI Number/Number segment | Terminal Type |
|---|---|
| 359084010545284 | Nokia N97 |
| 359084010545285 | Nokia X6 |
| 359084010545286 | Apple iPhone 3 |
| 359084010545287 | Apple iPad 2 |
| 359084010545300-359084010545400 | Blackberry 8800 |

Given that the IMEI number of the target charging terminal is 359084010545284, by searching the corresponding relationship in Table 1, the NAS can determine the type of the target charging terminal is Nokia N97. In addition, given that the IMEI number of the target charging terminal is 359084010545399, by searching the corresponding relationship in Table 1, the IMEI number of the target charging terminal falls within the number segment 359084010545300—359084010545400, and the NAS can determine the type of the target charging terminal is Blackberry 8800.

Step 24, the NAS sends to a charging system a trigger charging message, and the type of the target charging terminal is carried in the message.

Step 25, the charging system charges the target charging terminal according to the type of the target charging terminal.

Hereupon, the charging system resolves the trigger charging message, acquires the type of the target charging terminal, and charges the target charging terminal according to the type of the target charging terminal. For example, if the type of the target charging terminal is Nokia N97, the charging system performs the charging by employing a charging policy designated for the terminal type Nokia N97.

In the aforementioned process, if the corresponding relationship between the relevant information of the terminal identifier and the terminal type is stored in the GW, following the aforementioned step 22, the NAS device yet has to forward to the GW device (not shown in figures) the IMEI number of the target charging terminal. The process of determining the type of the target charging terminal by the GW in accordance with the IMEI number of the target charging terminal is the same as the process in steps 23-25. The difference is the executive body at present is the GW.

Figure 3:
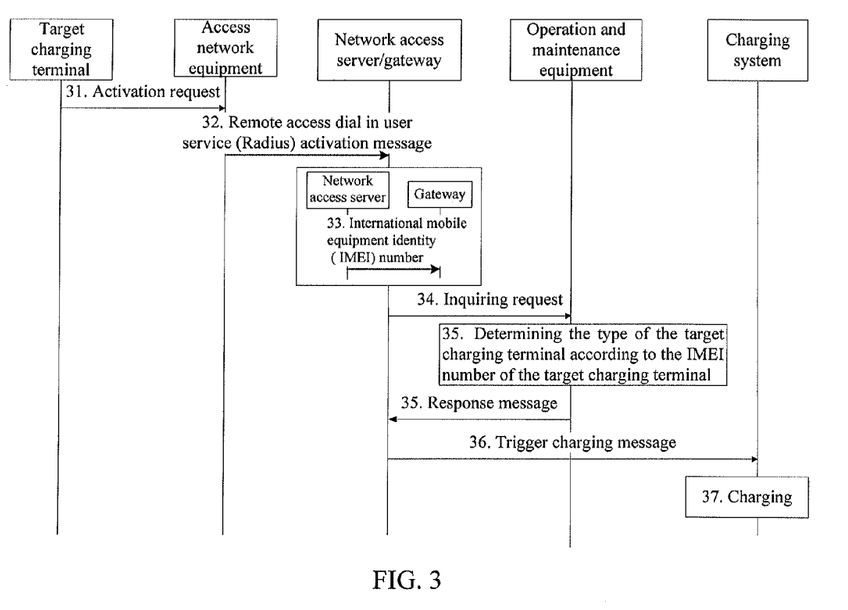
FIG. 3 is a flowchart illustrating a method for charging according to a third embodiment of the present invention.

In a third embodiment, a terminal-type database is set up, in which a corresponding relationship between relevant information of a terminal identifier and a terminal type is stored. The database is maintained by a customer service center/business office or an operation support system of an operator.

As shown in FIG. 3, a method for charging according to the third embodiment of the present invention includes:

step 31, when activating a data service request, a target charging terminal reports its IMEI number to an access network device via the activated request.

Step 32, the access network device sends to a NAS device the IMEI number of the target charging terminal via a Radius activation message.

Step 33, the NAS device forwards to a GW device the IMEI number of the target charging terminal.

Step 34, the NAS or the GW sends to a customer service center/business office, or an operation support system of an operator an inquiring request, in which the IMEI number of the target charging terminal is carried.

Step 35, the customer service center/business office, or the operation support system of the operator acquires a type of the target charging terminal from the terminal-type database, in accordance with the IMEI number of the target charging terminal.

Table 1 in the second embodiment, for example, is stored in the terminal-type database. Given that the IMEI number of the target charging terminal is 359084010545284, by searching the corresponding relationship indicated in Table 1, the NAS or the GW can determine that the type of the target charging terminal is Nokia N97. In addition, given that the IMEI number of the target charging terminal is 359084010545399, by searching the corresponding relationship in Table 1, the IMEI number of the target charging terminal falls within the number segment 359084010545300—359084010545400, and the NAS or the GW can determine that the type of the target charging terminal is Blackberry 8800.

Step 35, the customer service center/business office or the operation support system of the operator sends to the NAS or the GW a response message, in which the type of the target charging terminal is carried.

Step 36, the NAS or GW sends to a charging system a trigger charging message, in which the type of the target charging terminal is carried.

Step 37, the charging system charges the target charging terminal in accordance with the type of the target charging terminal.

Hereupon, the charging system resolves the trigger charging message, acquires the type of the target charging terminal, and charges the target charging terminal in accordance with the type of the target charging terminal. For example, if the type of the target charging terminal is Nokia N97, the charging system performs the charging by employing a charging policy designated for terminal types Nokia N97.

It shall be noted that, in the aforementioned embodiment, either the NAS or the GW may acquire individually the type of the target charging terminal from an operation and maintenance device. If it is the NAS that carries out individually the task, step 33 is unnecessary.

Figure 4:
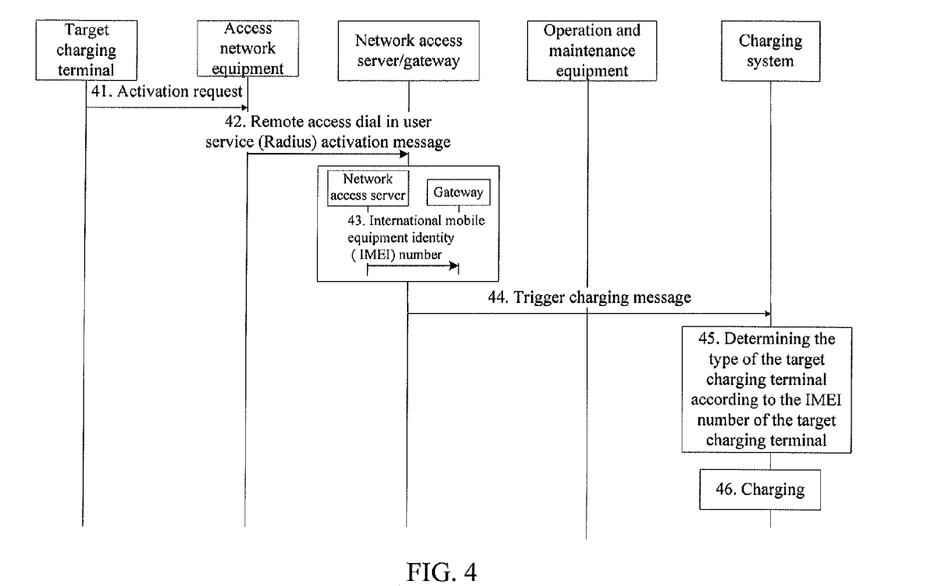
FIG. 4 is a flowchart illustrating a method for charging according to a forth embodiment of the present invention.

In a forth embodiment, a corresponding relationship between relevant information of a terminal identifier and a terminal type is stored in a charging system, and the corresponding relationship is synchronized by a customer service center/business office or an operation support system of an operator to a NAS or a GW.

As shown in FIG. 4, a method for charging according to the forth embodiment of the present invention includes:

Step 41, when activating a data service request, a target charging terminal reports its IMEI number to an access network device via the activated request.

Step 42, the access network device sends to the NAS device the IMEI number of the target charging terminal via a Radius activation message.

Step 43, the NAS device forwards to a GW device the IMEI number of the target charging terminal.

Step 44, the NAS or the GW sends to a charging system a trigger charging message, in which the IMEI number of the target charging terminal is carried.

Step 45, the charging system searches the corresponding relationship between the relevant information of the terminal identifier and the terminal type, and determines a type of the target charging terminal in accordance with the IMEI number of the target charging terminal.

Table 1 in the second embodiment is taken as an example. Given that the IMEI number of the target charging terminal is 359084010545284, by searching the corresponding relationship indicated in Table 1, the NAS or the GW can determine that the type of the target charging terminal is Nokia N97. In addition, given that the IMEI number of the target charging terminal is 359084010545399, by searching the corresponding relationship in Table 1, the IMEI number of the target charging terminal falls within the number segment 359084010545300—359084010545400. Thus, the NAS or the GW can determine that the type of the target charging terminal is Blackberry 8800.

Step 46, the charging system charges the target charging terminal in accordance with the type of the target charging terminal.

For example, if the type of the target charging terminal is Nokia N97, the charging system performs the charging by employing a charging policy designated for the terminal type Nokia N97.

It shall be noted that, in the aforementioned embodiment, step 43 is unnecessary.

Figure 5:
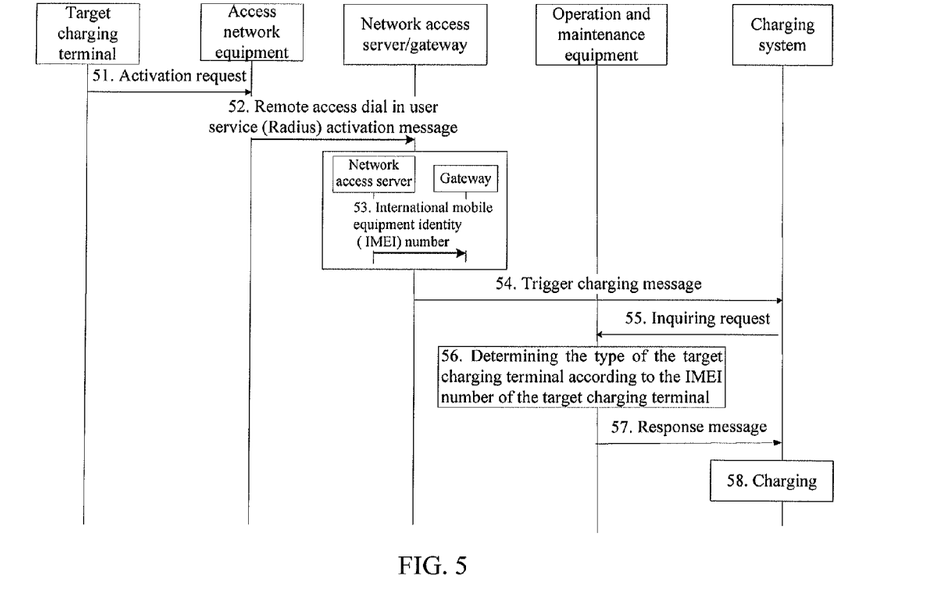
FIG. 5 is a flowchart illustrating a method for charging according to a fifth embodiment of the present invention.

In a fifth embodiment, a terminal-type database is set up, in which a corresponding relationship between relevant information of a terminal identifier and a terminal type is stored. The database is maintained by a customer service center/business office or an operation support system of an operator.

As shown in FIG. 5, a method for charging according to the fifth embodiment of the present invention includes:

step 51, when activating a data service request, a target charging terminal reports its IMEI number to an access network device via the activated request.

Step 52, the access network device sends to a NAS device the IMEI number of the target charging terminal via a Radius activation message.

Step 53, the NAS device forwards to a GW device the IMEI number of the target charging terminal.

Step 54, the NAS or the GW sends to a charging system a trigger charging message, in which the IMEI number of the target charging terminal is carried.

Step 55, the charging system sends to the customer service center/business office or the operation support system of the operator an inquiring request, in which the IMEI number of the target charging terminal is carried.

Step 56, the customer service center/business office or the operation support system of the operator acquires a type of the target charging terminal from the terminal-type database, in accordance with the IMEI number of the target charging terminal.

Table 1 in the second embodiment is taken as an example, and it is stored in the terminal-type database. Given that the IMEI number of the target charging terminal is 359084010545284, by searching the corresponding relationship indicated in Table 1, the NAS or the GW can determine that the type of the target charging terminal is Nokia N97. In addition, given that the IMEI number of the target charging terminal is 359084010545399, by searching the corresponding relationship in Table 1, the IMEI number of the target charging terminal falls within the number segment 359084010545300—359084010545400. Thus, the NAS or the GW can determine that the type of the target charging terminal is Blackberry 8800.

Step 57, the customer service center/business office or the operation support system of the operator sends to the charging system a response message, in which the type of the target charging terminal is carried.

Step 58, the charging system charges the target charging terminal in accordance with the type of the target charging terminal.

Hereupon, the charging system resolves the trigger charging message, acquires the type of the target charging terminal, and charges the target charging terminal in accordance with the type of the target charging terminal. For example, if the type of the target charging terminal is Nokia N97, the charging system performs the charging by employing a charging policy designated for the terminal type Nokia N97.

It shall be noted that, in the aforementioned embodiment, step 53 is unnecessary.

As it can be seen from the aforementioned second embodiment to the fifth embodiment, the charging system can accurately identify the terminal type, and carries out the differentiated charging for data service used by users in accordance with the terminal type, thus avoiding defrauding of a discount charging package of mobile data service for a designated terminal by users with non-designated terminals. Meanwhile, in the aforementioned embodiments, the charging package can be further subdivided in accordance with the terminal type accurately acquired, thus further enhancing user experience of mobile data service and improving user engagement.

Figure 6:
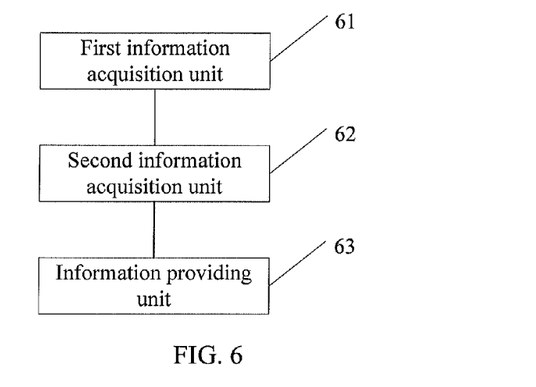
FIG. 6 is a schematic diagram of an apparatus for charging according to a sixth embodiment of the present invention.

As shown in FIG. 6, an apparatus for charging according to a sixth embodiment of the present invention includes: a first information acquisition unit 61 configured to acquire an IMEI number of a target charging terminal; a second information acquisition unit 62 configured to, according to a corresponding relationship between relevant information of a terminal identifier and a terminal type, determine a type of the target charging terminal by using the IMEI number of the target charging terminal to; and an information providing unit 63 configured to provide a charging system with the type of the target charging terminal so that the charging system charges the target charging terminal according to the type of the target charging terminal.

In the embodiment, the relevant information of the terminal identifier is either an IMEI number segment or an IMEI number.

Wherein, the first information acquisition unit 61 includes: a message receiving module configured to receive a Radius activation message sent by an access network device, wherein the IMEI number of the target charging terminal is carried in the Radius activation message; and a message resolving module configured to resolve the Radius activation message to acquire the IMEI number of the target charging terminal.

In light of the aforementioned method embodiments described, according to different forms of the stored corresponding relationship between the relevant information of the terminal identifier and the terminal type as well as the different storage locations of the corresponding relationship, in the present embodiment, the second information acquisition unit 62 may have different structures to acquire the type of the target charging terminal.

For example, the second information acquisition unit 62 may include: a first search module configured to search the corresponding relationship between the IMEI number segment and the terminal type stored therein, and determine an IMEI number segment to which the IMEI number of the target charging terminal belongs according to the IMEI number of the target charging terminal; and a first information acquisition module configured to employ the terminal type corresponding to the IMEI number segment to which the IMEI number of the target charging terminal belongs as the type of the target charging terminal, In another example, the second information acquisition unit 62 may include: a second search module configured to search the corresponding relationship between the IMEI number and the terminal type stored therein; and a second information acquisition module configured to determine the type of the target charging terminal according to the IMEI number of the target charging terminal.

In addition, the second information acquisition unit 62 may include: a first inquiring module configured to inquire the type of the target charging terminal from an operation and maintenance device by using the IMEI number of the target charging terminal; and a third information acquisition module configured to acquire the type of the target charging terminal via the operation and maintenance device; where the operation and maintenance device searches the corresponding relationship between the IMEI number segment and the terminal type stored therein, determines an IMEI number segment to which the IMEI number of the target charging terminal belongs according to the IMEI number of the target charging terminal, and employs the terminal type corresponding to the IMEI number segment to which the IMEI number of the target charging terminal belongs as the type of the target charging terminal, or, the operation and maintenance device searches the corresponding relationship between the IMEI number and the terminal type stored therein, and determines the type of the target charging terminal according to the IMEI number of the target charging terminal.

The apparatus illustrated in FIG. 6 may be located in a NAS, and the principle thereof may refer to the aforementioned method embodiments described.

As it can be seen, in the embodiment of the present invention, the charging system can acquire accurately the type of the target charging terminal, and thus charge correspondingly the target charging terminal according to the type of the target charging terminal. Therefore, using the charging apparatus according to the embodiment of the present invention, the charging accuracy of the charging system is improved.

Figure 7:
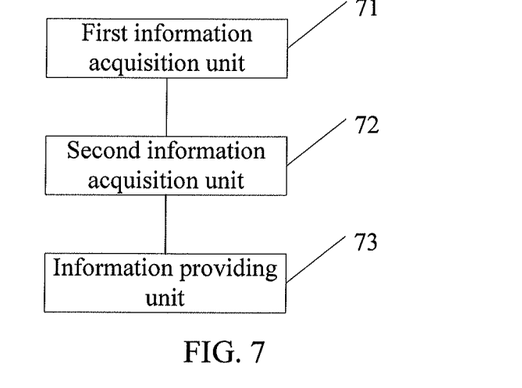
FIG. 7 is a schematic diagram of an apparatus for charging according to a seventh embodiment of the present invention.

As shown in FIG. 7, an apparatus for charging according to a seventh embodiment of the present invention includes: a first information acquisition unit 71 configured to acquire an IMEI number of a target charging terminal; a second information acquisition unit 72 configured to, according to a corresponding relationship between relevant information of a terminal identifier and a terminal type, determine a type of the target charging terminal by using the IMEI number of the target charging terminal; and an information providing unit 73 configured to provide a charging system with the type of the target charging terminal, so that the charging system charges the target charging terminal according to the type of the target charging terminal.

In the embodiment, the relevant information of the terminal identifier is either an IMEI number segment or an IMEI number.

Wherein the first information acquisition unit 71 is specifically configured to acquire the IMEI number of the target charging terminal via a network access server. Where the mode in acquiring the IMEI number by the network access server may refer to the aforementioned method embodiments described.

In light of the aforementioned method embodiments described, according to different forms of the stored corresponding relationship between the relevant information of the terminal identifier and the terminal type as well as the different storage locations of the corresponding relationship, in the present embodiment, the second information acquisition unit 72 may have different structures to acquire the type of the target charging terminal.

For example, the second information acquisition unit 72 may include: a first search module configured to search the corresponding relationship between the IMEI number segment and the terminal type stored therein, and determine an IMEI number segment to which the IMEI number of the target charging terminal belongs according to the IMEI number of the target charging terminal; and a first information acquisition module configured to employ the terminal type corresponding to the IMEI number segment to which the IMEI number of the target charging terminal belongs as the type of the target charging terminal.

In another example, the second information acquisition unit 72 may include: a second search module configured to search the corresponding relationship between the IMEI number and the terminal type stored therein; and a second information acquisition module configured to determine the type of the target charging terminal according to the IMEI number of the target charging terminal.

In addition, the second information acquisition unit 72 may include: a first inquiring module configured to inquire the type of the target charging terminal from an operation and maintenance device by using the IMEI number of the target charging terminal; a third information acquisition module configured to acquire the type of the target charging terminal via the operation and maintenance device; where the operation and maintenance device searches the corresponding relationship between the IMEI number segment and the terminal type stored therein, determines an IMEI number segment to which the IMEI number of the target charging terminal belongs according to the IMEI number of the target charging terminal, and employs the terminal type corresponding to the IMEI number segment to which the IMEI number of the target charging terminal belongs as the type of the target charging terminal, or, the operation and maintenance device searches the corresponding relationship between the IMEI number and the terminal type stored therein, and, according to the IMEI number of the target charging terminal, determines the type of the target charging terminal.

The apparatus illustrated in FIG. 7 may be located in a GW, and the principle thereof may refer to the aforementioned method embodiments described.

As it can be seen, in the embodiment of the present invention, the charging system can acquire accurately the type of the target charging terminal, and thus charge correspondingly the target charging terminal according to the type of the target charging terminal, therefore, using the charging apparatus according to the embodiment of the present invention, the charging accuracy of the charging system is improved.

Figure 8:
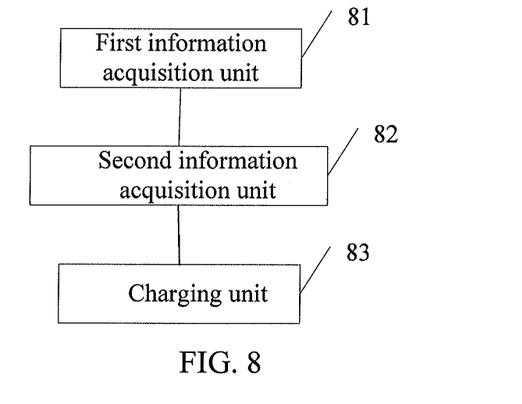
FIG. 8 is a schematic diagram of an apparatus for charging according to an eighth embodiment of the present invention.

As shown in FIG. 8, an apparatus for charging according to an eighth embodiment of the present invention includes: a first information acquisition unit 81 configured to acquire an IMEI number of a target charging terminal; a second information acquisition unit 82 configured to, according to a corresponding relationship between relevant information of a terminal identifier and a terminal type, determine a type of the target charging terminal by using the IMEI number of the target charging terminal; and a charging unit 83 configured to charge the target charging terminal according to the type of the target charging terminal.

In the embodiment, the IMEI number of the target charging terminal is the IMEI number of the target charging terminal, and the relevant information of the terminal identifier is either an IMEI number segment or an IMEI number.

Wherein the first information acquisition unit 81 inlcudes: a message receiving module configured to receive a trigger charging message sent by either a network access server or a gateway, wherein the IMEI number of the target charging terminal is carried in the trigger charging message; and an information resolving module configured to resolve the trigger charging message to acquire the IMEI number of the target charging terminal.

In light of the aforementioned method embodiments described, according to different forms of the stored corresponding relationship between the relevant information of the terminal identifier and the terminal type as well as the different storage locations of the corresponding relationship, in the present embodiment, the second information acquisition unit 82 may have different structures to acquire the type of the target charging terminal.

For example, the second information acquisition unit 82 can include: a forth search module configured to search the corresponding relationship between the IMEI number segment and the terminal type stored therein, and determine an IMEI number segment to which the IMEI number of the target charging terminal belongs according to the IMEI number of the target charging terminal; and a forth information acquisition module configured to employ the terminal type corresponding to the IMEI number segment to which the IMEI number of the target charging terminal belongs as the type of the target charging terminal.

In another example, the second information acquisition unit 82 can include: a fifth search module configured to search the corresponding relationship between the IMEI number and the terminal type stored therein; and a fifth information acquisition module configured to determine the type of the target charging terminal according to the IMEI number of the target charging terminal.

In addition, the second information acquisition unit 82 can include: a second inquiring module configured to search the corresponding relationship between the IMEI number and the terminal type stored therein; and a sixth information acquisition module configured to acquire the type of the target charging terminal via an operation and maintenance device; where the operation and maintenance device searches the corresponding relationship between the IMEI number segment and the terminal type stored therein, according to the IMEI number of the target charging terminal, determines an IMEI number segment to which the IMEI number of the target charging terminal belongs, and employs the terminal type corresponding to the IMEI number segment to which the IMEI number of the target charging terminal belongs as the type of the target charging terminal, or, the operation and maintenance device searches the corresponding relationship between the IMEI number and the terminal type stored therein, and, according to the IMEI number of the target charging terminal, determines the type of the target charging terminal.

The apparatus illustrated in FIG. 8 may be located in a charging system, and the principle thereof may refer to the aforementioned method embodiments described.

As it can be seen, in the embodiment of the present invention, the charging system can acquire accurately the type of the target charging terminal, and thus charge correspondingly the target charging terminal according to the type of the target charging terminal. Therefore, using the charging apparatus according to the embodiment of the present invention, the charging accuracy of the charging system is improved.

A person having ordinary skill in the art shall understand that, realizing either the full or part of the procedure of the methods in the aforementioned embodiments can be carried out by a computer program instructing relevant hardware, the program can be stored in a computer-readable storage medium, and, as the program is executed, it can comprise the procedure of the embodiment of each of the above methods. The storage medium therein can be a diskette, a compact disk, a read-only memory (Read-Only Memory, ROM), or a random access memory (Random Access Memory, RAM), etc.

The aforementioned embodiments are the specific embodiments of the present invention, however, the protection scope of the present invention is not limited thereto, and any person having ordinary skill in the art, within the technical scope disclosed by the present invention, can easily conceive any changes or substitutions which shall fall within the protection scope of the present invention. Therefore, the protection scope of the present invention shall be subject to the protection scope of claims thereof.

What is claimed is:

1. A method for charging a terminal with an international mobile equipment identity (IMEI), wherein the method is implemented in a communication network system, comprising:

acquiring, by a network access server (NAS) or a gateway, an international mobile equipment identity (IMEI) number of a target charged terminal;

determining, by the network access server (NAS) or the gateway, a type of the target charged terminal by utilizing the IMEI number of the target charged terminal, according to a corresponding relationship between relevant information of a terminal identifier and a terminal type; wherein the relevant information of the terminal identifier is related to the IMEI number and wherein the relevant information of the terminal identifier is one of an IMEI number segment or an IMEI number, and charging, by a charging system, the target charged terminal according to the type of the target charged terminal;

wherein the determining the type of the charged terminal by utilizing the IMEI number of the charged terminal, according to the corresponding relationship between the relevant information of the terminal identifier and the terminal type comprises:

searching, by the network access server, the corresponding relationship between the IMEI number segment and the terminal type stored therein, determining, by the network access server, an IMEI number segment to which the IMEI number of the charged terminal belongs according to the IMEI number of the charged terminal, and employing, by the network access server, a terminal type corresponding to the IMEI number segment to which the IMEI number of the charged terminal belongs as the type of the charged terminal; or inquiring, by the network access server, the type of the charged terminal from an operation and maintenance device by utilizing the IMEI number of the charged terminal, and acquiring, by the network access server, the type of the charged terminal via the operation and maintenance device; wherein the operation and maintenance device searches the corresponding relationship between the IMEI number segment and the terminal type stored therein, determines an IMEI number segment to which the IMEI number of the charged terminal belongs according to the IMEI number of the charged terminal, and employs a terminal type corresponding to the IMEI number segment to which the IMEI number of the charged terminal belongs as the type of the charged terminal, or the operation and maintenance device searches the corresponding relationship between the IMEI number and the terminal type stored therein, and determines the type of the charged terminal according to the IMEI number of the charged terminal.

2. The method according to claim 1, wherein the acquiring the IMEI number of the target charged terminal comprises:
receiving, by the network access server, a remote authentication dial in user service (Radius) activation message, wherein the IMEI number of a target charged terminal is carried in the Radius activation message; and
resolving, by the network access server, the Radius activation message to acquire the IMEI number of the target charged terminal.

3. The method according to claim 2,
the determining the type of the target charged terminal by utilizing the IMEI number of the target charged terminal, according to the corresponding relationship between the relevant information of the terminal identifier and the terminal type comprises:
searching, by the network access server, the corresponding relationship between the IMEI number and the terminal type stored therein, and determining, by the network access server, the type of the target charged terminal according to the IMEI number of the target charged terminal.

4. The method according to claim 1, wherein the acquiring the IMEI number of the target charged terminal comprises:
acquiring, by the gateway, the IMEI number of the target charged terminal via a network access server.

5. The method according to claim 4, wherein the relevant information of the terminal identifier is either an IMEI number segment or an IMEI number; and
the determining the type of the target charged terminal by utilizing the IMEI number of the target charged terminal, according to the corresponding relationship between the relevant information of the terminal identifier and the terminal type comprises:
searching, by the gateway, the corresponding relationship between the IMEI number segment and the terminal type stored therein, determining, by the gateway, an IMEI number segment to which the IMEI number of the target charged terminal belongs according to the IMEI number of the target charged terminal, and employing, by the gateway, a terminal type corresponding to the IMEI number segment to which the IMEI number of the target charged terminal belongs as the type of the target charged terminal; or searching, by the gateway, the corresponding relationship between the IMEI number and the terminal type stored therein, and determining, by the gateway, the type of the target charged terminal, according to the IMEI number of the target charged terminal; or inquiring, by the gateway, the type of the target charged terminal from an operation and maintenance device by utilizing the IMEI number of the target charged terminal, and acquiring, by the gateway, the type of the target charged terminal via the operation and maintenance device; wherein the operation and maintenance device searches the corresponding relationship between the IMEI number segment and the terminal type stored therein, determines an IMEI number segment to which the IMEI number of the target charged terminal belongs according to the IMEI number of the target charged terminal, and employs a terminal type corresponding to the IMEI number segment to which the IMEI number of the target charged terminal belongs as the type of the target charged terminal, or the operation and maintenance device searches the corresponding relationship between the IMEI number and the terminal type stored therein, and determines the type of the target charged terminal according to the IMEI number of the target charged terminal.

6. The method according to claim 1, wherein the charging the target charged terminal according to the type of the target charged terminal comprises:
sending a trigger charging message to a charging system, wherein the type of the target charged terminal is carried in the trigger charging message so that the charging system charges the target charged terminal according to the type of the target charged terminal.

7. The method according to claim 1, wherein the acquiring the IMEI number of the target charged terminal comprises:
receiving, by a charging system, a trigger charging message sent by the network access server or the gateway, wherein the IMEI number of the target charged terminal is carried in the trigger charging message; and
resolving, by the charging system, the trigger charging message to acquire the IMEI number of the target charged terminal.

8. The method according to claim 7, wherein the relevant information of the terminal identifier is either an IMEI number segment or an IMEI number; and
the determining the type of the target charged terminal by utilizing the IMEI number of the target charged terminal, according to the corresponding relationship between the relevant information of the terminal identifier and the terminal type comprises:
searching, by the charging system, the corresponding relationship between the IMEI number segment and the terminal type stored therein, determining, by the charging system, an IMEI number segment to which the IMEI number of the target charged terminal belongs according to the IMEI number of the target charged terminal, and employing, by the charging system, a terminal type corresponding to the IMEI number segment to which the IMEI number of the target charged terminal belongs as the type of the target charged terminal; or
searching, by the charging system, the corresponding relationship between the IMEI number and the terminal type stored therein, and determining, by the charging system, the type of the target charged terminal according to the IMEI number of the target charged terminal; or inquiring, by the charging system, the type of the target charged terminal from an operation and maintenance device by utilizing the IMEI number of the target charged terminal, and acquiring, by charging system, the type of the target charged terminal via the operation and maintenance device;

wherein the operation and maintenance device searches the corresponding relationship between the IMEI number segment and the terminal type stored therein, determines an IMEI number segment to which the IMEI number of the target charged terminal belongs according to the IMEI number of the target charged terminal, and employs a terminal type corresponding to the IMEI number segment to which the IMEI number of the target charged terminal belongs as the type of the target charged terminal, or the operation and maintenance device searches the corresponding relationship between the IMEI number and the terminal type stored therein, and determines the type of the target charged terminal according to the IMEI number of the target charged terminal.

9. The method according to claim 7, wherein the charging the target charged terminal according to the type of the target charged terminal comprises:

charging, by the charging system, the target charged terminal according to the type of the target charged terminal.

10. An apparatus for charging a terminal with an international mobile equipment identity (IMEI), comprising:

a nonvolatile memory storing processor-executable instructions; and a processor in communication with the memory, the processor is configured to execute the stored instructions to:

an IMEI number of a target charged terminal;

determine a type of the target charged terminal by utilizing the IMEI number of the target charged terminal, according to a corresponding relationship between relevant information of a terminal identifier and a terminal type; and provide a charging system with the type of the target charged terminal so that the charging system charges the target charged terminal according to the type of the target charged terminal; and execute the stored instructions to:

search the corresponding relationship between an IMEI number segment and the terminal type stored therein, according to the IMEI number of the charged terminal, determine the IMEI number segment to which the IMEI number of the charged terminal belongs, and employ a terminal type corresponding to the IMEI number segment to which the IMEI number of the charged terminal belongs as the type of the charged terminal; or inquire the type of the charged terminal from an operation and maintenance device by using the IMEI number of the charged terminal, acquire the type of the charged terminal via the operation and maintenance device, wherein the operation and maintenance device searches the corresponding relationship between an IMEI number segment and the terminal type stored therein, determines the IMEI number segment to which the IMEI number of the charged terminal belongs according to the IMEI number of the charged terminal, and employs a terminal type corresponding to the IMEI number segment to which the IMEI number of the charged terminal belongs as the type of the charged terminal, or, the operation and maintenance device searches the corresponding relationship between the IMEI number and the terminal type stored therein, and determines the type of the charged terminal according to the IMEI number of the charged terminal.

11. The apparatus according to claim 10, wherein the processor is further configured to execute the stored instructions to:

receive a remote authentication dial in user service Radius activation message, wherein the IMEI number of the target charged terminal is carried in the Radius activation message; and resolve the Radius activation message to acquire the IMEI number of the target charged terminal.

12. The apparatus according to claim 10, wherein the processor is further configured to execute the stored instructions to acquire the IMEI number of the target charged terminal via a network access server.

13. The apparatus according to claim 10, wherein the processor is further configured to execute the stored instructions to:

search the corresponding relationship between the IMEI number and the terminal type stored therein; and determine the type of the target charged terminal according to the IMEI number of the target charged terminal.

14. An apparatus for charging a terminal with an international mobile equipment identity (IMEI), comprising:

a nonvolatile memory storing processor-executable instructions; and a processor in communication with the memory, the processor is configured to execute the stored instructions to:

acquire an IMEI number of a target charged terminal;

determine a type of the target charged terminal by using the IMEI number of the target charged terminal, according to a corresponding relationship between relevant information of a terminal identifier and a terminal type; and charge the target charged terminal according to the type of the target charged terminal; and execute the stored instructions to:

search the corresponding relationship between an IMEI number segment and the terminal type stored therein, and determine the IMEI number segment to which the IMEI number of the charged terminal belongs according to the IMEI number of the charged terminal, and, employ the terminal type corresponding to the IMEI number segment to which the IMEI number of the charged terminal belongs as the type of the charged terminal; or search the corresponding relationship between the IMEI number and the terminal type stored therein, and, acquire the type of the charged terminal via an operation and maintenance device, wherein the operation and maintenance device searches the corresponding relationship between an IMEI number segment and the terminal type stored therein, determines the IMEI number segment to which the IMEI number of the charged terminal belongs according to the IMEI number of the charged terminal, and employs the terminal type corresponding to the IMEI number segment belongs the IMEI number of the charged terminal as the type of the charged terminal, or, the operation and maintenance device searches the corresponding relationship between the IMEI number and the terminal type stored therein, and determines the type of the charged terminal according to the IMEI number of the charged terminal.

15. The apparatus according to claim 14, wherein the processor is further configured to execute the stored instructions to:
  receive a trigger charging message sent by a network access server or a gateway, wherein the IMEI number of the target charged terminal is carried in the trigger charging message; and
  resolve the trigger charging message to acquire the IMEI number of the target charged terminal.

16. The apparatus according to claim 14, wherein the processor is further configured to execute the stored instructions to:
  search the corresponding relationship between the IMEI number and the terminal type stored therein; and
  determine the type of the target charged terminal according to the IMEI number of the target charged terminal.

* * * * *